Nov. 25, 1952  E. S. PRINCE ET AL  2,619,332
MULTIPLE DRINK MIXING MACHINE
Filed June 28, 1950  3 Sheets-Sheet 1

INVENTORS.
Earl S. Prince
BY Robert MacDougall
Mason, Kolehmainen, Rathburn & Wyss
Att'ys

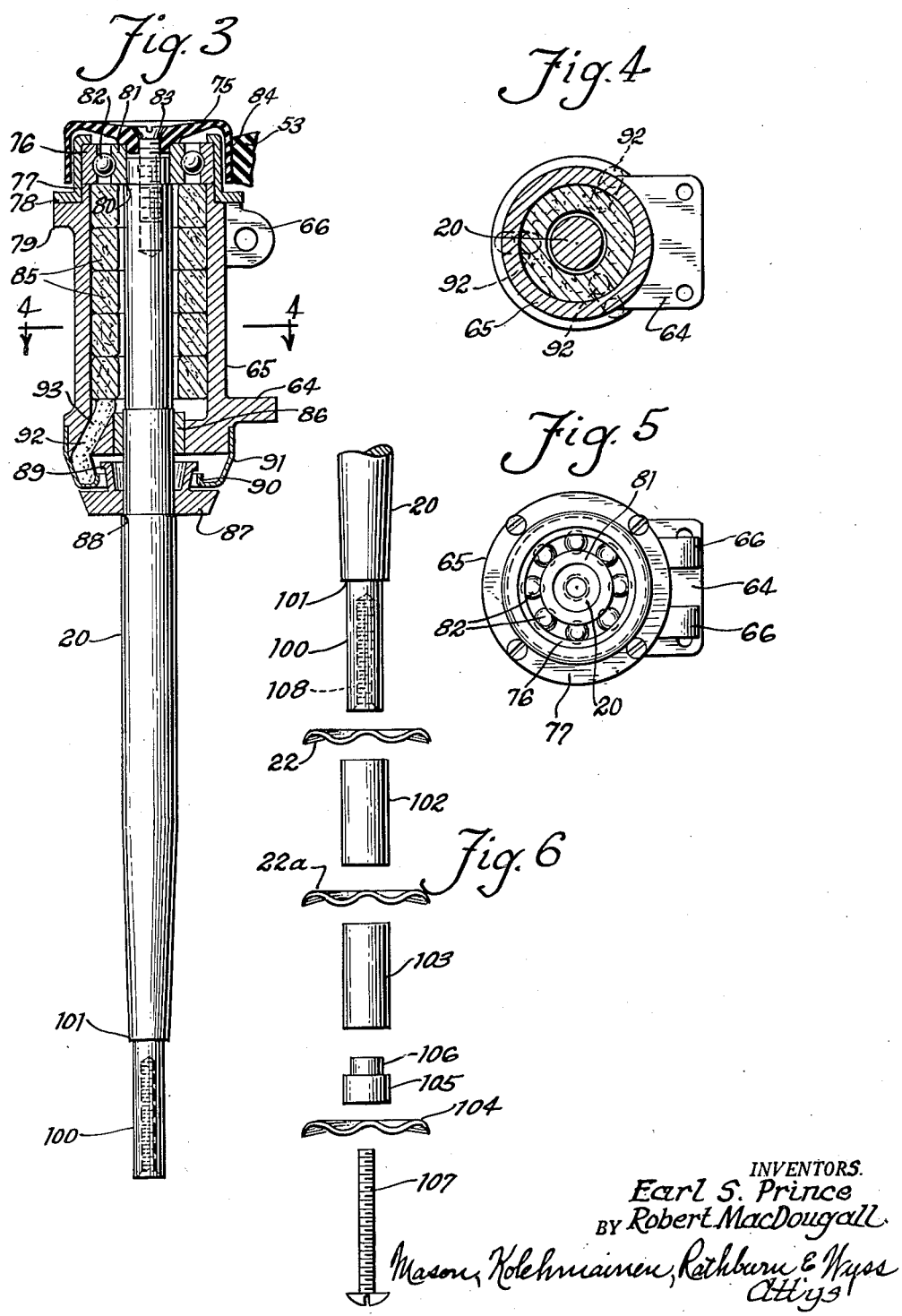

INVENTORS
Earl S. Prince
BY Robert MacDougall

Patented Nov. 25, 1952

2,619,332

UNITED STATES PATENT OFFICE 2,619,332

MULTIPLE DRINK MIXING MACHINE

Earl S. Prince and Robert MacDougall, Rock Falls, Ill., assignors to Prince Castle Manufacturing Div., Inc., Sterling, Ill., a corporation of Illinois Application June 28, 1950, Serial No. 170,906

2 Claims. (Cl. 259—131)

The present invention relates to multiple drink mixing machines of the general type disclosed in the co-pending application of Earl S. Prince and John Brotheridge entitled Multiple Drink Mixing Machine, Serial No. 620,304, filed October 4, 1945, now Patent No. 2,531,989, dated November 28, 1950.

In the multiple drink mixing machine described in the above-identified application, a plurality of depending spindle assemblies which are spaced around the periphery of a central master driving wheel are arranged to be moved into engagement with the driving wheel when a particular cup containing liquid to be mixed is placed about a particular mixing spindle. The rotating spindles are provided with agitator members which agitate, or beat, the liquid in the cup.

In prior art devices wherein a driven member is shifted so as to be rotated by frictional engagement with a larger driving member, the normal side thrust on the shaft of the driven member is substantial and may, in many instances, cause deformation or bending of the shaft. Such deformation tends to produce uneven and excessive wear in the bearings supporting the driven member. Accordingly, it is an object of the present invention to provide a new and improved multiple drink mixing machine having a plurality of depending spindle assemblies arranged to be driven by a central master driving wheel and in which there is provided means for substantially preventing accidental bending of the upper portion of the spindles by the operator and during normal use thereof.

It is another object of the present invention to provide a new and improved multiple drink mixing machine having a plurality of depending spindle assemblies arranged to be driven by a central master driving wheel and wherein each mixing spindle construction includes an upper ball bearing which is positioned on the upper end of the mixing spindle, the ball bearing being positioned on the spindle in the plane of the master driving wheel whereby side thrust on the spindle does not cause bending thereof and consequent eccentricity of the driven member.

Also, in many instances, it is desirable to provide a mixing spindle assembly in which the number and position of the agitator members associated with each spindle may be readily changed to accommodate liquids of various constituents. For example, if a very thick liquid, such as in malted milk, is to be mixed, it is desirable to have the agitators spaced evenly along a relatively large portion of the spindle so as to obtain a maximum beating action. On the other hand, when a very thin liquid is to be mixed the agitator should not be positioned along the upper portion of the spindle in order to prevent agitation near the surface and splashing of the liquid out of the mixing container. Also, in most mixing operations it is desirable to position at least one agitator very close to the bottom of the container as the heaviest liquids settle to the bottom and are otherwise unaffected by the agitation. However, when using glass mixing containers the bottom thereof is substantially thicker than a corresponding metal container and hence the position of the bottommost agitator must be varied to accommodate containers of various thicknesses.

It is further desirable to provide certain spindles of a multiple spindle machine with differently positioned agitators so that liquids of various constituents may be mixed without changing agitators. By such an arrangement, different types of liquids may be simultaneously mixed without changing the position of the agitators on a particular spindle. Accordingly, it is a further object of the present invention to provide a new and improved multiple drink mixing machine in which a multiple agitator assembly associated with each spindle may be readily adapted for optimum mixing of a particular liquid.

It is a still further object of the present invention to provide a new and improved multiple drink mixing machine wherein is provided a multiple agitator assembly associated with each spindle which may be easily modified to provide a variety of types of agitation.

The invention, both as to its organization and method of operation, together with further objects and advantages thereof, will best be understood by reference to the following specification taken in connection with the accompanying drawings, in which:

Fig. 3 is a vertical sectional view taken along the central axis of the mixing spindle assembly of Fig. 2;

Fig. 4 is a sectional view taken along the lines 4—4 of Fig. 3;

Fig. 5 is a top view of the spindle assembly of the Fig. 3 with the pinion member removed;

Fig. 6 is an exploded view of the multiple agitator assembly of Fig. 2;

Figure 1:
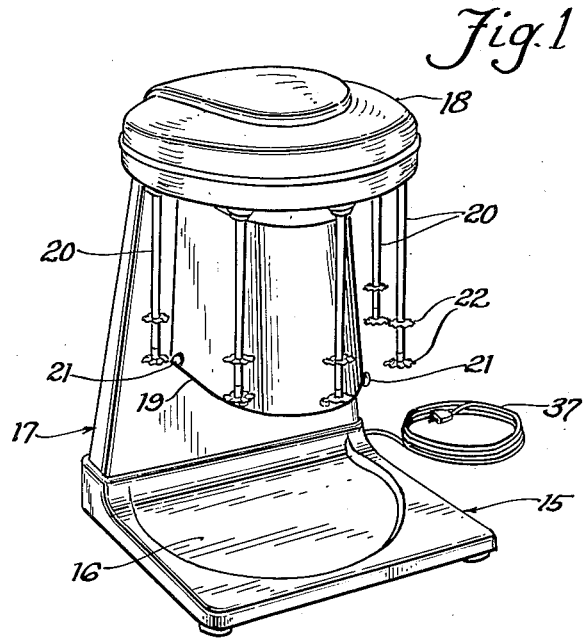
Fig. 1 is a perspective view of the multiple drink mixing machine.

Referring now more particularly to the drawings, there is illustrated in Fig. 1 the complete multiple drink mixing machine embodying the principles of the present invention. As shown, the multiple drink mixing machine comprises a flat stationary base, indicated generally at 15, which is provided with a depressed circular portion and a surrounding upstanding rim so as to provide a shallow drip tray 16. The base member 15 is preferably a stamping of stainless steel although it might comprise a casting or stamping of any suitable metal and is formed at the rear thereof with a preferably integral, hollow, upstanding column indicated generally at 17. A mixing head indicated generally at 18 is supported by the column 17 and includes a motor housing 19 and a plurality of depending spindle assemblies 20 which may be driven from a central master driving wheel contained within the mixing head 18 and described in more detail hereinafter. A plurality of supporting studs 21 are positioned about the bottom rim of the motor housing 19 and are adapted to engage the bottom lip of a cup containing the liquid to be mixed. Each of the spindles 20 is provided with a plurality of agitator members 22, which, in accordance with the principles of the present invention, may be variably positioned along the length of the depending spindle so as to provide optimum mixing action with a liquid of a particular constituency.

While reference may be made to the above identified application for a detailed description of the general operation of the multiple drink mixing machine, for the purposes of the present invention it may be stated that a cup containing the liquid to be mixed is placed about a particular spindle assembly and is raised upwardly so as to engage the bottom lip thereof with the associated supporting stud 21. When the cup is raised to this position, the spindle assembly is moved into engagement with the central master driving wheel and the spindle is rotated at a high rate of speed so as to produce the desired agitation of the liquid in the cup by means of the agitator members 22.

Figure 2:
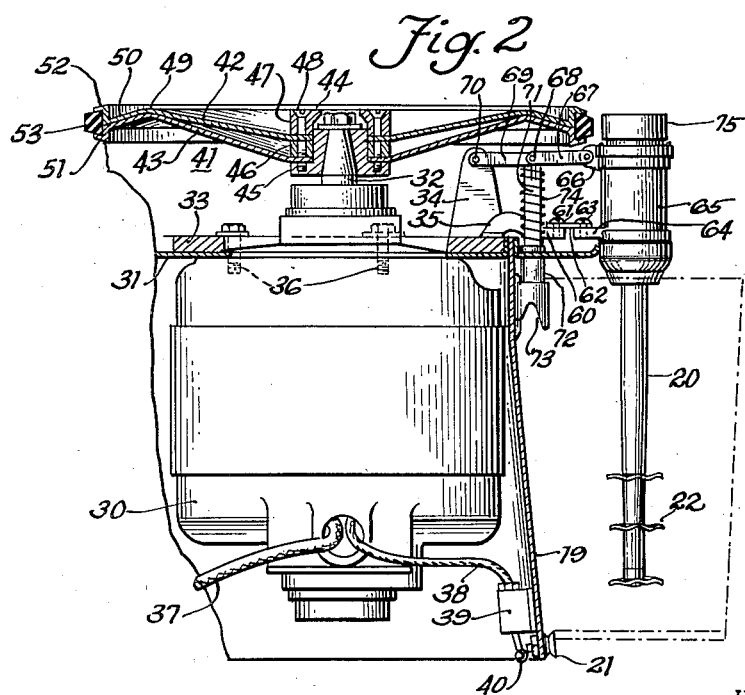
Fig. 2 is a vertical sectional view taken along the central axis of the device of Fig. 1 showing in full the mixing spindle assembly of the present invention.

Referring now in more detail to the constructional features of the multiple drink mixing machine of Fig. 1, and particularly with reference to the way in which the spindle assemblies are moved into engagement with the master driving wheel, there is shown in Fig. 2 a vertical sectional view of the driving assembly of Fig. 1 as taken along the central axis of the driving wheel and with the motor housing and mixing head cover removed. Thus, referring to this figure, the driving motor 30 is supported on a motor plate 31 which may be of sheet metal and which is supported by the upstanding column 17 and is provided with a relatively large aperture through which the shaft or spindle 32 of the motor 30 may extend. The motor plate 31 is adapted to carry a spider comprising an integral metal casting which comprises a circular rim 33 which is provided with a plurality of upstanding posts one of which is indicated at 34. These posts correspond to the plurality of spindle assemblies and are spaced equidistantly around the arcuate portion of the spider. Each post includes an outstanding, radially projecting tongue, or lug 35. The same bolts 36 attach the spider to the motor plate 31 and likewise pass into the top portion of the motor and affix it rigidly to the motor plate and spider whereby the motor 30 is mounted in the mixing head with the motor spindle 32 upstanding therefrom. The bottom of the motor is provided with electrical cables 37 and 38, the latter connecting with a switch 39 having a control member 40 which projects beyond the lower edge of the housing 19. The electrical cord 37 passes downwardly through the column and thence out through the open bottom of the column for connection to a suitable source of electric current.

The central motor spindle 32 has affixed thereto a relatively large, centrally disposed driving wheel indicated generally at 41 which is preferably formed of sheet metal. The driving wheel 41 is comprised of an upper sheet metal disk 42 and a lower sheet metal disk 43, the two disks being secured to the motor spindle 32 by means of a central circular block 44 having an outstanding lower flange 45 provided with suitably threaded perforations. In addition, there is provided a spacing ring 46 likewise having perforations and an upper ring-like cap 47. A series of bolts or screws 48 pass through registering openings in the spacing ring 46 and into the threaded flange 45 of the block 44. The inner circular edges of the two disks 42 and 43 are received between the upper edges of the flange 45, the lower edges of the spacing ring 46 and the upper edge of the spacing ring 46 and the top cap 47, whereby the two disk-like portions are clamped to the motor spindle 32 for rotation therewith. The two disks 42 and 43 are shaped to converge in the manner shown and extend slightly upwardly and meet at an annular locus 49 from which locus they extend in parallelism and in juxtaposed overlapping relation as indicated at 50. The portions in contact as at 50 are held together by virtue of the illustrated construction to form a sturdy driving disk. Each disk is provided with one-half portion of a rim receptacle such as at 51 and 52 which is adapted to receive a rubber tire or rim 53 which may be removed and replaced or repaired.

In order selectively to drive any one of the depending spindle assemblies by engagement with the rim 53 of the master driving wheel, the outwardly extending tongue portion 35 of the spider 33 is provided with a flat portion 60 adapted to have fastened thereto by means of bolts 61 a resilient plate 62. The plate 62 is provided with apertures through which screws 63 pass and thread into the holes formed in a laterally projecting lug 64 of a generally circular bearing housing 65 whereby the housing 65 is resiliently mounted on the spider by means of the resilient plate 62. The bearing housing at its upper end includes a pair of perforated ears, one of which is shown at 66, to which there is pivotally connected a link 67 which is perforated at its inner end to receive a pin 68 which pivotally connects the link 67 with another link 69, which is in turn pivoted as at 70 in an aperture in one of the posts 34 of the spider 33. The two links 67 and 69 form a toggle joint connection between the upper end of the bearing housing 65 and the top of the post 34. Passing over the pin 68 is the slotted portion of an extension 71 of a plunger 72. This plunger is provided on its bottom portion with a peculiarly formed slot 73 conformed to receive the rim of a cup in a manner shown substantially in the Brotheridge Patent 2,218,808 issued on October 22, 1940. In addition, surrounding the upper portion of the plunger 72 there is provided a coiled spring 74 which has its bottom end contacting against a shoulder on the plunger 72 and has its top portion pressing against the under side of the two links 67 and 69 about the pin 68. The function of the spring 74 is normally to force the plunger 72 downwardly to a point where the pivot 68 is slightly below the horizontal level of the outer ends of the links 67 and 69. However, upon raising of the plunger 72 by the insertion of the upper edge of the rim of a mixing cup in the slot 73, the plunger 72 is moved upwardly, compressing the spring 74 and forcing the links 67 and 69 of the toggle upwardly. Since the link 69 is pivoted to the stationary post 34 the upper portion of the bearing housing 65 is pulled inwardly.

The mixing spindle 20 is journaled for rotation within the bearing housing 65 and is provided at the upper end thereof with a pinion driven member 75 which is secured to the end of the mixing spindle 20 in a manner to be described in more detail in connection with Fig. 3. Upon insertion of the cup, as hereinbefore described, the plunger 72 is raised, thereby causing the bearing housing to be moved inwardly against the tension of resilient plate 62 and against the tension of spring 74 so as to cause the pinion driven member 75 of a particular spindle to engage the rubber tire 53 of the master driving wheel whereby that particular spindle is directly rotated at a relatively high rate of speed. Each particular spindle is thus capable of being selectively controlled by engaging or disengaging its pinion member from the constantly rotating central driving wheel. When the cup is released, the resilient mounting 62, which has been put under stress, will straighten out and carry the smaller pinion member 75 out of contact with the rotating central driving wheel 53, thereby to assist the spring 74 in its purpose. The spring 74 of the plunger then carries the central pivoted pin 68 downwardly below the level of the pivoted ends of the links 67 and 69 thereby to lock the pinion member out of driving engagement so that it cannot be inadvertently thrown into an engagement unless another cup is inserted into a mixing position.

From the foregoing discussion, it is evident that the insertion of a cup into the slot 63 and the forcing upwardly of the plunger 72 allows the operator to exert substantial sidewise thrust upon the upper end of the mixing spindle 20 through the medium of the pinion member 75. This is readily apparent when it is realized that the cup which is inserted must be raised above its final position by an amount sufficient to clear the upper edge of the supporting stud 21 before it is secured between the slot 73 and the V of the supporting stud. If the mixing spindle is journaled within the bearing housing 65 at a point removed from the plane of the driving wheel 53, the above described pressure which may be exerted by the operator during insertion of the cup into the assembly, and the normal side thrust on the top of the mixing spindle during contact with the driving wheel, tends to produce bending of the mixing spindle and to cause it to become misaligned so as to produce excessive wear in the bearing supports, an eccentric beating action and intermittent contact between the driving wheel and the pinion member 75.

In accordance with an important feature of the present invention the mixing spindle assembly is constructed in the manner shown in Fig. 3 so as substantially to eliminate the above-described defects due to side thrusts upon the mixing spindle. As shown, the bearing housing 65 is provided with a unitary bearing assembly comprising an outer ball bearing race 76 and inner ball bearing race 81, ball bearings 82 and a flanged annular ring 77. This assembly is held in position on housing 65 by the bottom flange 78 of the ring 77 which rests on a corresponding flange 79 formed in the upper end of the bearing housing and is secured thereto by suitable screws or similar fastening means. The upper end of the spindle 20 is provided with a reduced end portion which defines an upper shoulder 80 and this reduced end portion is received within the bearing assembly described above. The pinion member 75, which is preferably constructed of suitable plastic or phenolic material, is seated upon the upper surface of the inner ball bearing race 81 and is secured to the end of the mixing spindle 20 by means of the screw 83. The pinion member 75 is cup-shaped so as to fit over the end of the bearing housing and the outer surface 84 thereof contacts the end of the rubber-tired rim 53 of the master driving wheel.

With this arrangement, the side thrust applied to the upper end of the spindle 20 when the pinion 75 is urged into engagement with the rim 53 is substantially in line with the plane of the upper support for the spindle 20, that is, the plane of the ball bearing members 82. By thus supporting the upper end of the spindle substantially in the plane of the master driving wheel and applying side thrust from the wheel through the cup-shaped pinion 75 to the extremity of the spindle 20 through the medium of the supporting screws 83 and inner bearing race 81, the possibility of accidental bending of the mixing spindle is substantially eliminated and the mixing spindle runs true despite relatively large pressures which may be exerted thereon by unskilled operators as described heretofore.

The central portion of the bearing housing 65 is hollow and is provided with a series of oiled impregnated felt washers 85. The bottom portion of the housing is closed by means of the sleeve bearing 86 and in addition there is provided a slinger means 87 which is pressed onto the spindle and against the shoulder portion 88 thereof. This slinger means includes an upstanding, circular outwardly extending flange 89 the outer end of which overlies an inwardly and upwardly projecting flange 90 on a sleeve-like closure 91 attached to the bottom of the bearing housing.

The trough formed between the flange 89 and the spindle 20 catches oil which seeps through the bearing 86 and by centrifugal force throws the oil out into the trough defined by the flanged portion 90. To conduct the escaped oil back into the reservoir portion of the housing there is provided a plurality of wicks 92 which pass through openings 93 in the bottom of the bearing housing and extend downwardly into the sleeve-like portion 91, the action being such that any excess oil which collects in the trough 90 is conducted by capillary attraction back up into the oil reservoir of the bearing housing. To provide a smooth surface between the rapidly moving slinger member 87 and a fixed sleeve member 91, these members are preferably shaped as shown in Fig. 3 so as to provide a continuous line therebetween without projecting corners which would be dangerous to the operator.

In order to provide a multiple agitator assembly in which the position of individual agitators may be readily varied to meet the need of different mixing operations, and to the end that various spindles of the multiple spindle mixing machine may be provided with different agitator combinations for these different mixing operations each of the depending spindles 20 is provided with an end portion 100 of reduced diameter which defines a shoulder 101 against which the multiple agitator assembly may be held. As is clearly shown in Fig. 6, the multiple agitator assembly comprises a series of agitator members 22, 22a and 104 which are spaced apart by means of a plurality of sleevelike spacers 102 and 103, the spacers 102 and 103 being adapted to fit over the reduced end portion 100 of the spindle. To provide a seat for the bottom-most agitator 104 and a bearing surface against which the assembly may be held, there is provided a sleevelike extension spacer 105 which is provided with an upper portion 106 of reduced diameter which is adapted to fit within the adjacent spacer 103. The assembly is secured in operative relation by means of the bolt 107 which extends through the agitator 104, the extension spacer 105, and the spacer 103 and threads into the opening 108 provided in the bottom end of the spindle 20.

Figure 7:
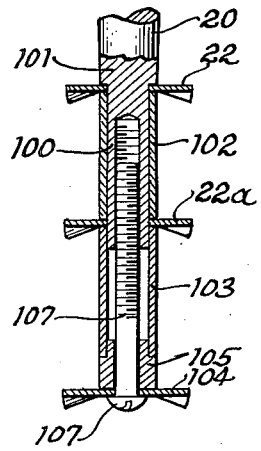
Figs. 7-9 illustrate various arrangements of the multiple agitator assembly.

With the above-described multiple agitator assembly, a wide variety of agitator positions and combinations may be readily obtained by unskilled or semi-skilled operators by changing the relative positions of the agitators 22 and the intermediate spacers 102 and 103. Thus, if a uniform beating action is desired throughout a substantial length of the spindle 20, the arrangement shown in Fig. 7 may be utilized. As shown, the agitators 22 are separated by the length of the spacer 102 and the bottom-most agitator 104 is seated upon the extension spacer 105 which interfits with the bottom portion of the spacer 103, the securing bolt 107 holding the entire assembly in place against the shoulder 101 provided on the spindle 20. In this connection, it will be understood that the agitators 22 and 22a are provided with a relatively large aperture so as to fit over the end portion 100 of the spindle. However, the agitator 104 is provided with a smaller aperture of the diameter of the bolt 107 so as to be securely held against the bottom surface of the extension spacer 105.

Figure 8:
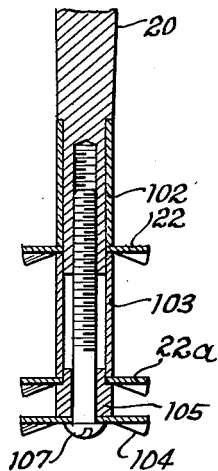

In the event that a concentrated heating action is desired at the bottom of the container, the arrangement shown in Fig. 8 may be utilized. Thus, referring to this figure, the upper agitator 22 is positioned between the spacers 102 and 103, the second agitator 22a is positioned between the spacer 103 and the extension spacer 105 and the bottom agitator 104 is again positioned between the head of the bolt 107 and the bottom surface of the extension spacer 105. It will be evident from Fig. 8 that the agitators 22, 22a, and 104 are positioned near the bottom of the spindle 20 and, hence, agitation near the surface of the liquid may be substantially prevented while obtaining a uniform mixing action.

Figure 9:
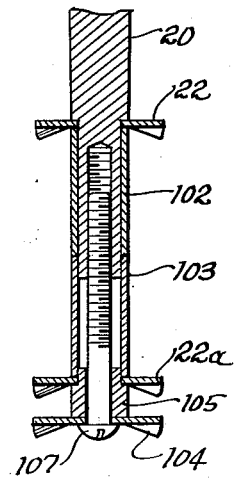

A further alternative arrangement of the agitator members is shown in Fig. 9 wherein the agitators 22 and 22a are positioned apart by the combined length of the spacers 102 and 103 and the bottom spacer 104 is again positioned on the bottom surface of the extension spacer 105. It will be apparent from Figs. 7–9 that a wide variety of agitator combinations may be provided while utilizing a minimal number of component parts which may be rearranged as desired.

Figure 10:
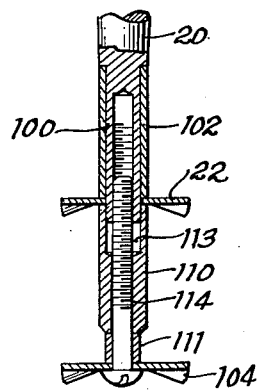
Figs. 10-12 illustrate various arrangements of an alternative multiple agitator assembly which is particularly adapted for use with mixing cups of various thicknesses.
Figure 11:
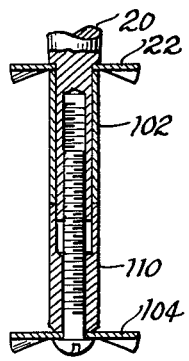
Figure 12:
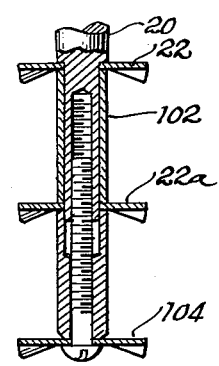

In order to provide a multiple agitator assembly which may be employed with containers of various thicknesses, the alternative spacer and agitator assembly shown in Figs. 10–12 may be employed. Thus, referring to these figures, there is provided an upper spacer 102, an intermediate spacer 110 and a lower spacer 111, which spacers separate the agitator members 22, 22a, and 104. The intermediate spacer 110 is provided with a hollow upper portion 113 having an inner diameter sufficient to permit insertion of the spacer over the reduced end portion 100 of the spindle 20. The intermediate spacer 110 is further provided with an aperture 114 through the bottom portion thereof which is adapted to receive the securing bolt 107. The agitator member 104 is provided with a relatively small aperture which is adapted to receive the bolt 107. The bottom spacer 111 is of somewhat smaller diameter than the diameter of the spacers 102 and 110 and is likewise provided with a central aperture adapted to receive the bolt 107.

In the event that a glass mixing cup is to be utilized with the multiple agitator spindle assembly of Fig. 10, the assembly is modified in the manner shown in Fig. 11 so as to reduce the total length of the agitator assembly by the length of the bottom spacer 111. Thus, as shown in Fig. 11, the agitator 104 is positioned adjacent the bottom of the intermediate spacer 110 and the topmost agitator 22 is separated therefrom by the combined lengths of the spacer 102 and 110. With this alternative arrangement, the length of the multiple agitator assembly may be readily shortened by removal of the bottom spacer 11 so as to permit the use of glass mixing cups with the interchangeable multiple agitator assembly described above. A further modification of the above-described alternative multiple agitator assembly is shown in Fig. 12, wherein the agitators 22 and 22a are equally spaced along the spindle above the bottom agitator 104, the total length of the multiple agitator assembly being shortened by omission of the spacer 111.

From the foregoing it is evident that a wide variety of agitator combinations may be employed with a minimum number of component parts. Also, by utilizing the intermediate spacer 110 and the extension spacer 111, the multiple agitator assembly may be readily adapted for use with mixing cups of widely varying dimensions.

While there have been illustrated certain of the agitator configurations which may be achieved by use of the multiple agitator assembly of the present invention, it will be understood that such illustrations are only by way of example and that a number of other combinations may be employed. For example, the length of the reduced end portion of the mixing spindle may be increased so as to accommodate a plurality of the spacers 102 in which event a greater number of agitators may be positioned as desired along the length of the mixing spindle.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In a multiple drink mixing machine, the combination of a support, a master driving wheel, a motor for driving said wheel, a plurality of depending mixing spindles mounted on said support, each of said spindles including a hollow bearing housing through which the upper portion of the spindle passes, ball bearing means positioned at the upper end of said bearing housing between said housing and said spindle, an inverted cup-shaped friction driver pinion member of relatively small diameter enclosing the upper end of said housing and secured to the upper end of said spindle, and means for shifting said bearing housing to provide frictional engagement of said pinion member with said driving wheel, said ball bearing means being positioned substantially in the plane of said driving wheel whereby said pinion member may be brought into engagement with said driving wheel with sufficient pressure to cause frictional rotation thereof by said driving wheel without bending the upper end of said spindle.

2. In a multiple drink mixing machine, the combination of a support, a master driving wheel, a motor for driving said wheel, a plurality of depending mixing spindles mounted on said support, each of said spindles including a hollow bearing housing through which the upper portion of the spindle passes, a ball bearing assembly having an outer race positioned atop the upper end of said housing and having an inner race secured to the upper end of said spindle, a retaining ring for securing said outer race in position atop said housing, an inverted cup shaped friction driven pinion member adapted to fit over said retaining ring and secured to the upper end of said spindle, and means for shifting said bearing housing to contact said pinion member with said driving wheel, said ball bearing means being positioned substantially in the plane of said driving wheel whereby said pinion member may be brought into engagement with said driving wheel with sufficient pressure to cause frictional rotation thereof by said driving wheel without bending the upper end of said spindle.

EARL S. PRINCE.
ROBERT MacDOUGALL.

REFERENCES CITED

The following references are of record in the file of this patent:

UNITED STATES PATENTS

| Number | Name | Date |
|---|---|---|
| 1,074,397 | Westby | Sept. 30, 1913 |
| 1,351,243 | Graves | Aug. 31, 1920 |
| 1,519,533 | Dingle | Dec. 16, 1924 |
| 2,218,808 | Brotheridge | Oct. 22, 1940 |
| 2,221,315 | Okum | Nov. 12, 1940 |
| 2,254,236 | Myers | Sept. 2, 1941 |
| 2,464,588 | Knudsen et al. | Mar. 15, 1949 |
| 2,498,570 | Myers | Feb. 21, 1950 |